US005454041A

United States Patent [19]

Davis

[11] Patent Number: 5,454,041

[45] Date of Patent: Sep. 26, 1995

[54] MIX-MINUS MONITOR SYSTEM

[75] Inventor: Donald E. Davis, Margate, Fla.

[73] Assignee: Sony Electronics Inc., Park Ridge, N.J.

[21] Appl. No.: 201,997

[22] Filed: Feb. 25, 1994

[51] Int. Cl.[6] .......... H04B 1/00

[52] U.S. Cl. .......... 381/119; 381/83; 381/93; 379/202; 379/206

[58] Field of Search .......... 348/13, 14, 15; 381/83, 93, 199; 379/202, 206

[56] References Cited

U.S. PATENT DOCUMENTS 4,734,934 3/1988 Boggs .......... 379/202

*Primary Examiner*—Curtis Kuntz

*Assistant Examiner*—Minsun Oh

*Attorney, Agent, or Firm*—Ronald P. Kananen

[57] ABSTRACT

Disclosed is a mixer console which is capable of providing a mix-minus audio monitor signal to several locations from which an input audio signal is provided. The mix-minus audio signal consists of the sum of all active input channels except for the input channel to which the mix-minus audio signal is provided. Thus, the mix-minus signal permits monitoring without feedback or echo effects.

7 Claims, 4 Drawing Sheets

MIX-MINUS MONITOR SYSTEM

FIELD OF THE INVENTION

This invention relates to a device for providing a mixed monitor signal to a location from which an input signal is sent to a mixer, wherein the input signal is removed from the mixed monitor signal.

BACKGROUND OF THE INVENTION

In live broadcast productions, several separate input channels may be input to a single broadcast location or to several broadcast locations linked together, for example, by satellite or microwave. The several inputs are processed and mixed together at a studio facility. In order to facilitate such a broadcast production from the various signals, it is necessary to provide a monitor signal of the mixed output signal to each of the input locations so that the persons providing the inputs may interact with each other. However, when the mixed signal is provided to a remote location it may result in feedback or an echo effect from a delayed return.

For example, a talk show based in Los Angeles, Calif. may include a host in Los Angeles conducting an interview with a person in a studio in London, England. The talk show audio and video signals would be sent as a monitor feed to the location in London, and might include audio signals from the interviewer as well as from the audience. Likewise, the interviewer and the audience would require a monitor feed to hear the interviewee. Most likely, the audio monitor feed from London would be sent to Los Angles via satellite, travelling a large distance in between. Due to this distance, a delay is introduced into the monitor signal. When received and routed through a mixing console in Los Angeles, the incoming signal would be placed in the broadcast signal path and the monitor signal path. If this monitor signal is rebroadcast to London, an additional delay is introduced. The result would be an "echo" of the interviewee's voice when received back in London.

FIG. 1 depicts such a situation. A signal starting with the interviewer's microphone at the main studio 2 passes through an audio mixer from where it is sent via a satellite 6 to a remote studio or mobile location 4 via transmitting equipment. This signal is received at the remote location with a slight time delay $t=d/r$ where d is the distance travelled and r is the signal speed.

The interviewee's audio signal travels back along this same path from the remote location 4 to the main studio 2 with the same delay t. However, the signal from the remote location 4 would be mixed with the audio from the main studio 2 and distributed back to the remote location over the same path. As a result, the interviewee would hear his voice with an echo of 2 t.

In order to avoid this problem, the monitor signal sent back to the remote location 4 could have the audio signal from the remote location removed. For example, the remote signal could simply be not assigned to the monitor path. However, as the number of feeds increases, it becomes difficult to keep track of each signal that is to be assigned. This increases the risk that a monitor signal will lack all the signals intended to be monitored, or will contain a signal originating from the monitor location thereby causing feedback or echo effects.

There is accordingly a need to provide an audio mixing system in which each location may be provided with a monitor feed which lacks an input signal originating from the monitor location. There is a further need to accomplish this goal in a manner which is not prohibitively expensive and which is relatively convenient.

SUMMARY OF THE INVENTION

It is an object of the invention to meet these needs and others by providing an audio mixer device for mixing a plurality of input audio channels, comprising: a plurality of connecting terminals for receiving a corresponding number of the plurality of input audio channels; and a plurality of mix-minus circuits for obtaining a mixed minus signal based on the plurality of input audio channels. According to the invention, each mix-minus circuit includes switching means for routing one of the plurality of input audio channels to a bus according to a logic signal input to the mixer device, the bus being connected to a summing circuit which sums together the input audio channel with additional audio signals provided to the bus and providing a summed audio signal based thereon to an output terminal; an inverter circuit having an output coupled to the output of the summing circuit, the inverter circuit inverting the input audio channel by shifting the phase of the first audio channel by 180° and providing an inverted audio signal to the output of the inverter circuit; and means coupled to the output of the inverter circuit and the output of the summing circuit for routing a mix-minus signal based on a resulting combining of the inverted audio signal and the sum signal to an output terminal located on the mixer device.

According to one aspect of the invention the plurality of connecting terminals, the plurality of mix-minus circuits, and each of the output terminal are located on a corresponding number of input/output modules provided in the audio mixer device.

According to another aspect of the invention the summing circuit is provided on a cleanfeed module located in the mixer device.

According to yet another aspect of the invention, the means for routing to the output terminal a mix-minus signal includes an analog switch which alternatively routes the mix-minus signal or a direct output audio signal according to a second logic signal provided from the connector.

According to still another aspect of the invention, the mix-minus circuit further comprises a switching network which provides either the input audio signal or a prefaded signal as the direct output, wherein the input audio signal is transmitted through a fader circuit prior to being input to the mix-minus circuit and the prefaded signal is directly input to the fader circuit without being first transmitted through the fader circuit.

According to another aspect of the invention, the first logic signal and the second logic signal are controlled by a control device, the control device including a microprocessor and an associated memory, the associated memory storing the state of each of the first logic signal and the second logic signal provided to each the mix-minus circuits.

According to still another aspect of the invention, the audio mixer device is coupled to a broadcasting means for providing an input audio signal to one of the input/output modules, the input audio signal being received from a remote location, and for broadcasting a monitor signal received from the output terminal of the input/output module to which the broadcasting means is coupled.

DETAILED DESCRIPTION OF THE PREFERRED EMBODIMENTS

Figure 2:
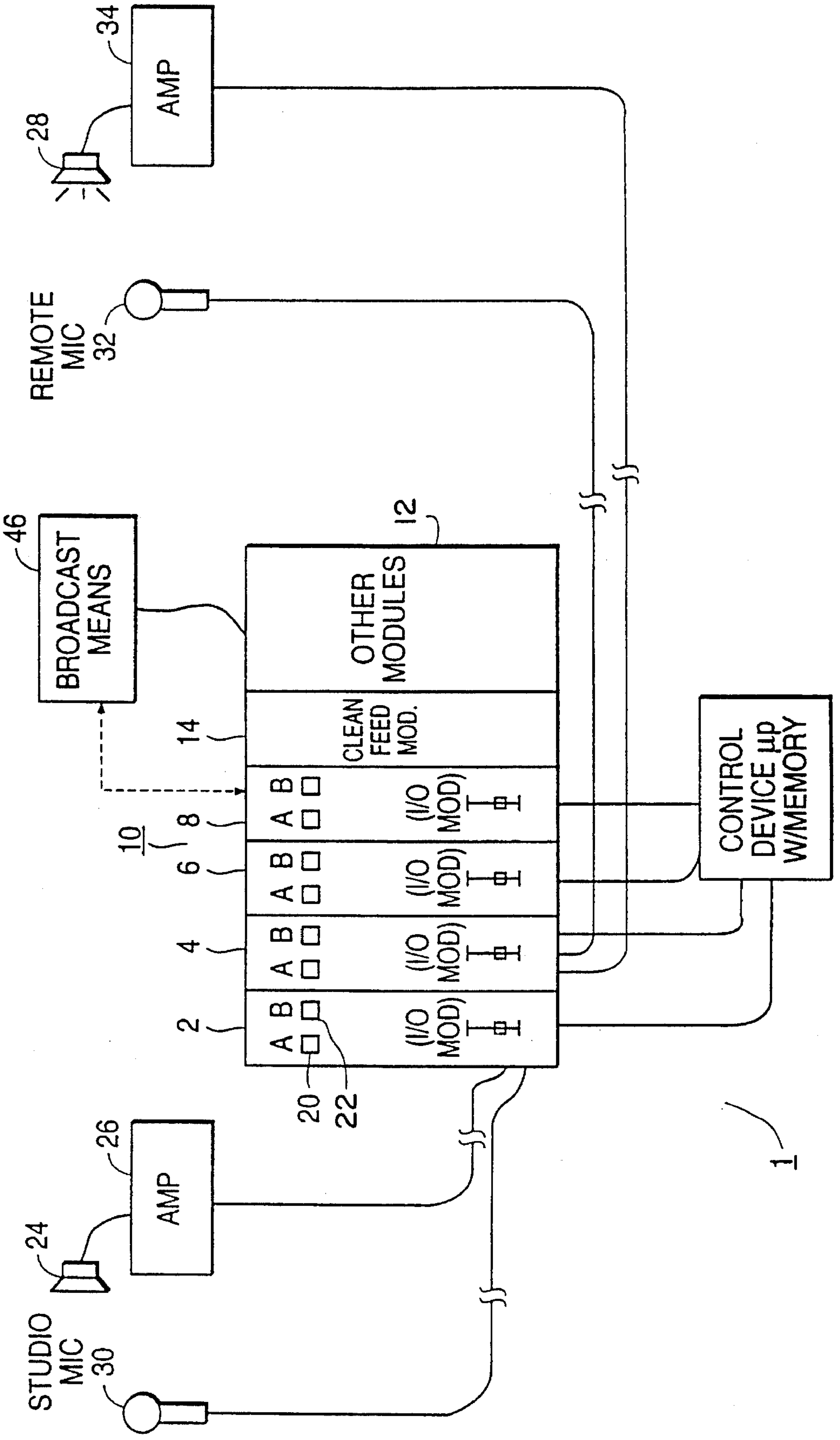
FIG. 2 is a view of a mixer console according to the present invention.

FIG. 2 shows a system 1 in which a mixing console 10 is used to mix signals from several inputs and provide monitor signals to each input location. A modular type mixer console 10 is shown in which a plurality of input-output (I/O) modules 2, 4, 6 and 8 each are capable of receiving two audio inputs A and B. These inputs may be from two single channel devices or from one dual channel device. Each module 2, 4, 6 and 8 includes a pair of select switches 20 and 22 for selecting (or deselecting) one or both of the input audio channels A and B. While two channels are disclosed for each I/O module shown, more channels (or only one) may be input via each I/O module.

While not shown, each audio channel A and B is provided to each of the I/O modules located in the mixer console through a connector port located on the input module. The audio channel is then both processed and routed by the input module. Because more than one channel is input to each module, each channel may be selected or deselected with a corresponding switch 20, 22 on the display portion of the I/O module.

In the example shown, a first I/O module 2 is coupled through a connector port (not shown) to a single channel microphone 30, which may be a studio microphone, for example. This studio microphone 30 is located in close proximity to a monitor speaker 24. The monitor speaker 24 is provided with a monitor signal from an amplifier 26 which is output from the I/O module 2.

A second I/O module 4 is coupled by wire to a second microphone 32 located at a remote location. The second microphone is similarly located in close proximity to a monitor arrangement consisting of a speaker 28 and an amplifier 30. The amplifier drives the speaker with a monitor signal provided from a connector port located on the I/O module 4.

Figure 1:
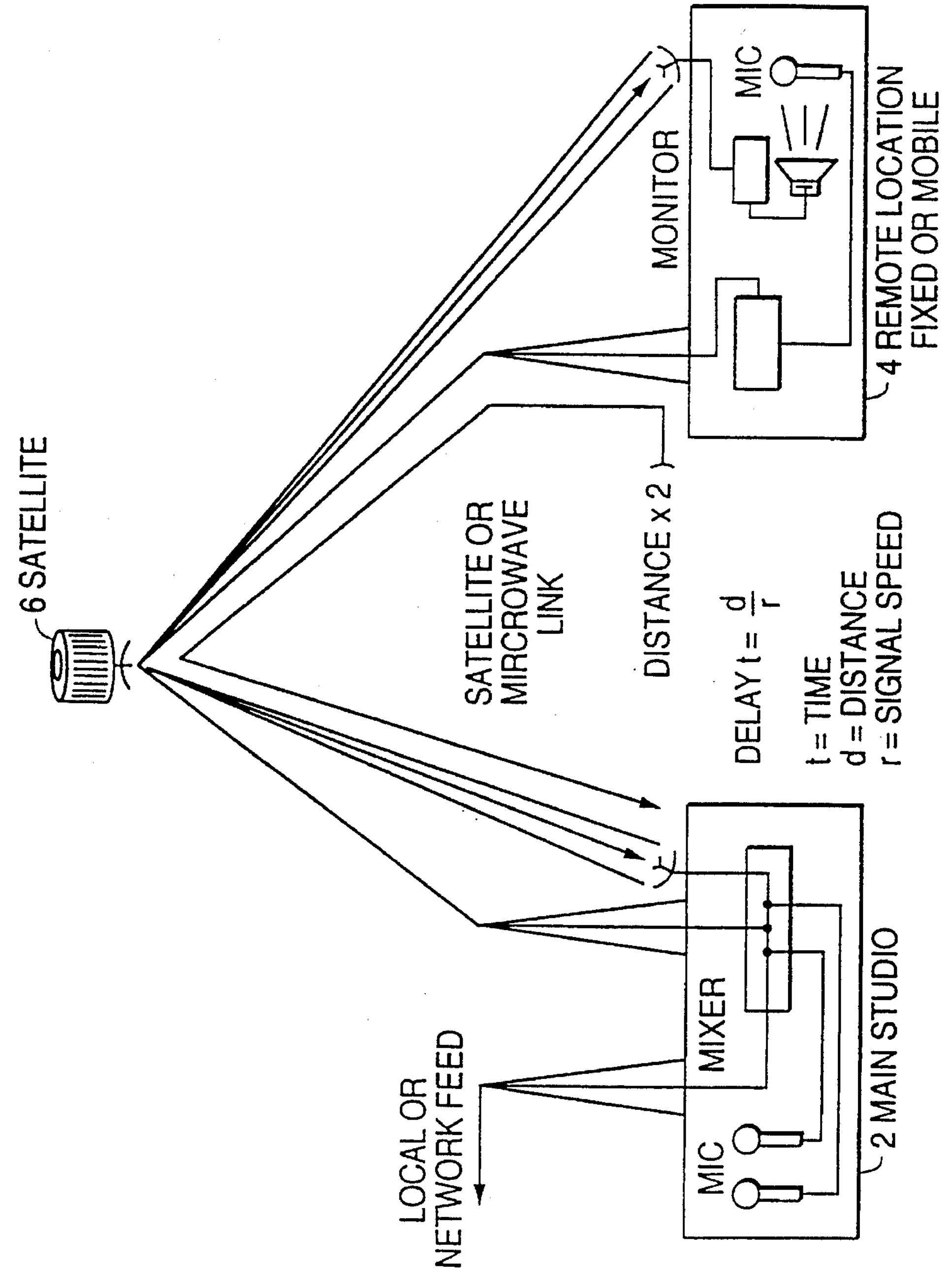
FIG. 1 PRIOR ART
FIG. 1 is an illustration of a broadcast production arrangement.

The system 1 includes broadcasting equipment 46, such as a transmitter and receiver linked to a remote studio, such as shown in FIG. 1. In this example, an audio channel which is received from such a remote location is provided to the mixing console and is assigned to an I/O module 8. The I/O module 8 may in turn provide a monitor signal to the broadcasting transmitter by which a monitor signal can be sent to the remote location.

The mixing console 10 further includes a cleanfeed module 14 from which a monitor signal may be provided which contains all the signals which have been mixed in the console 10. The system 1 may include other modules 12 which are used for other functions associated with the mixer. Additionally, the mixer 10 may be coupled to a control device that includes a microprocessor and associated memory. The microprocessor may be used to store configuration information so that a particular configuration of input and output devices may be stored and recalled. More specifically, the microprocessor may be coupled to each individual I/O module to thereby control the selection of input channels and/or monitor signals in the I/O module.

Each of the I/O modules 2, 4, 6, and 8 are accessed with a fifty-pin D-SUB connector located on the rear panel of each of the I/O modules (not shown). This control port allows the selection of either direct out or mix-minus out from balanced output drivers in the I/O modules (also located in the D-SUB connector). This switch controls the output supplied to the monitor devices from each of the I/O modules 2, 4, 6, and 8. As explained in greater detail below, this control port may be used to select a direct output of the selected input audio signal(s) supplied to the I/O module or a mix-minus output which includes all the signals input to the mixer console except the selected input audio signal(s) supplied to the I/O module. This selection may be achieved by use of a microprocessor coupled to the D-SUB connector.

Although in the examples discussed herein, a mix-minus signal is usually desired, a direct monitor signal is made available to provide flexibility in the system by facilitating applications in which feedback or echo would not be present. For example, the direct out signal could be used to provide the signal to a multitrack recorder device.

FIG. 2 illustrates an example of how the system might be used. Assuming that the audio input from the studio microphone 30 is coupled to channel A of the I/O module and is selected to be active, the channel is coupled to a bus in the mixer console from which it is mixed with other selected input signals. The mixed signal may then be broadcast or recorded as desired. A monitor signal from the I/O module is supplied to the amplifier 26 via a D-SUB connector. If the control port is set for direct output, the input from the studio microphone 30 is amplified and broadcast from the speaker 24. Because this monitor signal is likely to cause feedback in a broadcasting application, the operator may instead set the control port for transmission of a mix-minus monitor signal. This signal would comprise all the selected input audio signals except for the input audio signal from the studio microphone 30. Thus, if signal from the studio microphone 30 is being summed with the audio signals from the remote microphone 32 and a signal from the broadcast means 46, the user of the microphone 30 would be able to hear these other two audio signals without the introduction of feedback.

Similarly, the monitor signal sent to a remote location with the broadcast means 46 may be set to either direct or mix-minus output at the corresponding I/O module 8 to which the remote input audio signal is assigned. By selecting a mix-minus output, a monitor signal may be supplied to the remote location without the echo effects described in reference to FIG. 1. This is because the monitor signal from the I/O module 8 which is transmitted to the remote location will not contain the audio signal input to the I/O module 8 from the remote location.

Figure 3A:
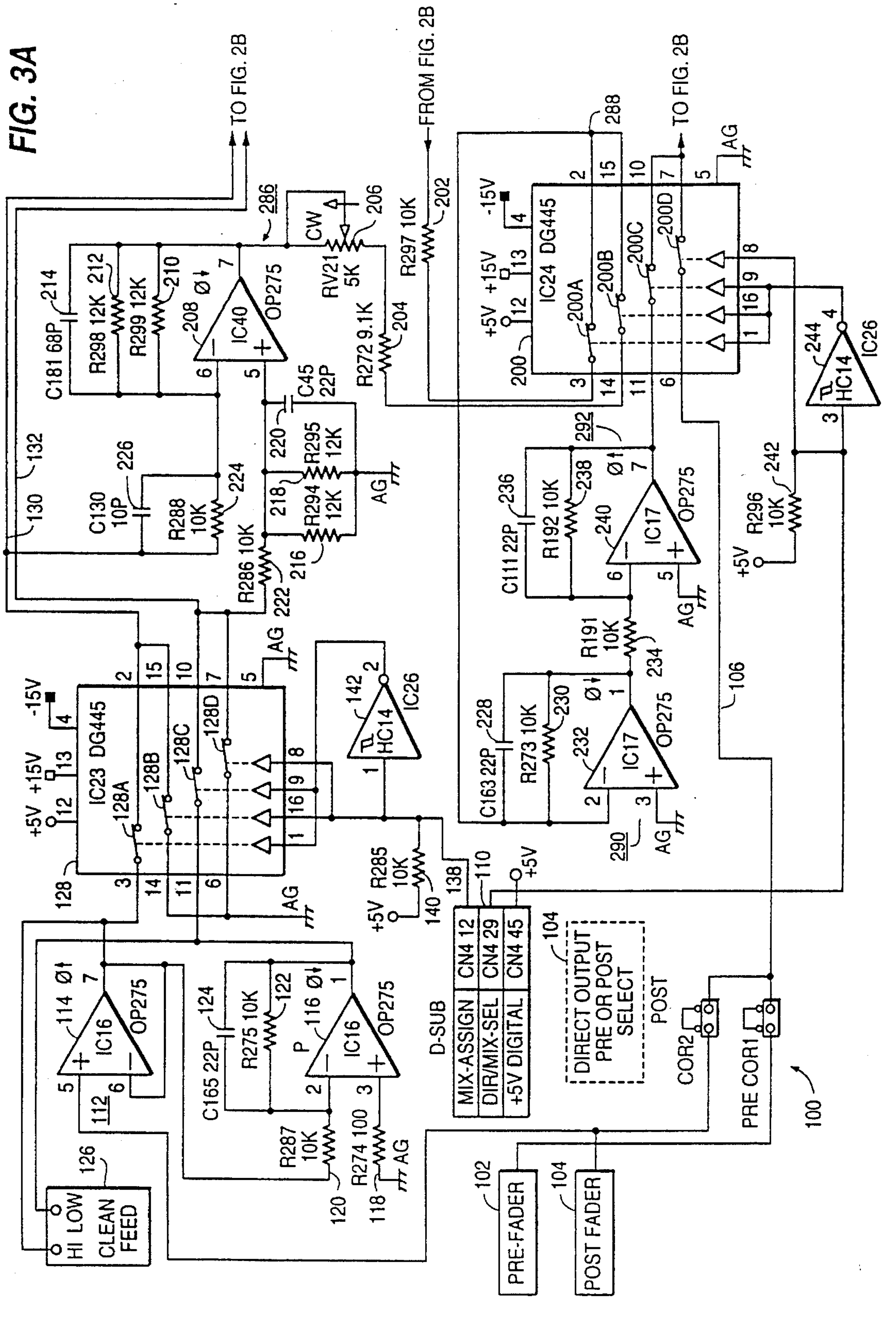
FIG. 3 is a schematic diagram illustrating a preferred embodiment of the invention.
Figure 3B:
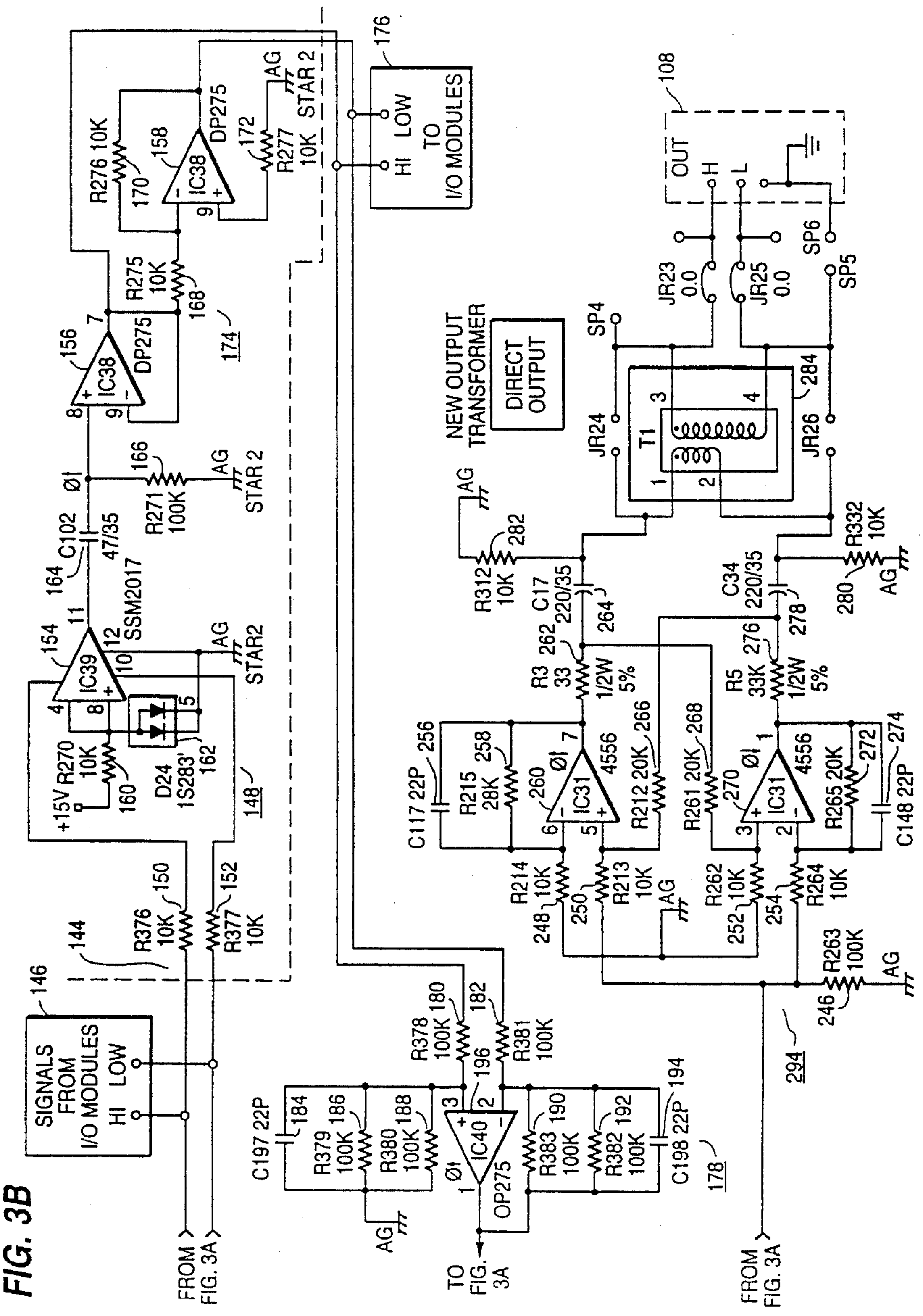

A preferred embodiment by which the mix-minus or direct monitor output may be achieved is shown in the schematic diagrams of FIGS. 3A and 3B. FIG. 3A shows a circuit 100 which is preferably located within an I/O module such as described above. Corresponding circuits may be provided in each I/O module of the mixer console. This circuit 100 receives two audio input signals—a prefade signal 102 and a post fade signal 104. Both these signals correspond to the selected audio signals which are input to the I/O module. However, the prefade audio signal corresponds to an audio signal which has not been faded up or down (according to techniques known in the art) with a fader located in the mixer console. The postfade audio signal corresponds to the output signal from fader circuitry located in the mixer console.

As shown, both the prefade and postfade signal are coupled to a pre or post select switching arrangement 104 through which the desired signal may be coupled to a direct out signal line 106. This desired signal may be coupled to the monitor output terminal 108, depending on the state of the direct/mix-minus select signal 110, as described herein.

The postfade signal is coupled to a balanced driver circuit 112 comprised of operational amplifiers 114 and 116. The postfade signal is input to the noninverting input of operational amplifier 114. The inverting input of this amplifier is coupled with an output terminal and the inverting input of operational amplifier 116. Together with resistors 118, 120, and 122, and a capacitor 124, the second operational amplifier 114 provides a second output from the prefade audio signal. Arranged in this way, a high level output is obtained from the output of the operational amplifier 114 and a low level output is obtained from the output of operational amplifier 116, thereby providing a balanced signal to a balanced bus consisting of signal paths 130 and 132. This balanced bus is coupled to other circuitry in the mixer console, including cleanfeed output circuitry 126.

The high and low signals from the balanced driver circuit 112 is provided to an analog switch 128. The analog switch 128 is controlled by a mix-minus assignment signal obtained from a D-SUB connector as described above. When the mix-minus assignment pin 138 of the D-SUB connector is grounded, the high and low signals which form the balance driver circuit 112 are passed along signal paths 130 and 132. More specifically, when the mix-minus assignment pin 138 is set to ground, the switches 128A and 128C of the analog switch 128 receive a logic low signal, thereby permitting the signals to pass. The other two switches 128B and 128D are coupled to the pin 138 via an inverter 142, and therefore receive a logic high signal which opens the switch. Thus, the signals on the paths 130 and 132 remain ungrounded.

On the other hand, when the mix-minus assignment pin is left ungrounded, a logic high signal is transmitted to the switches 128A and 128C, thereby opening the paths from the balanced driver. A logic low signal is provided via the inverter 142 to the remaining switches 128B and 128D, thereby closing the signal paths 103 and 132 to ground.

As shown in FIG. 3B, when the mix-minus assignment pin is grounded, the signals from the balanced driver circuit 112 is coupled along the balanced bus comprised of signal paths 130 and 132 to a balanced bus located in a separate module, represented by a dashed line. In the preferred embodiment, the separate module is a clean feed module from which a cleanfeed signal may be obtained from a mixer console. The balanced signal from the I/O module is coupled to a summing balanced bus 144 which is coupled to signals from other I/O modules 146.

The balanced bus is coupled via resistors 150 and 152 to a summing amplifier circuit 148 which is a balanced input amplifier. This amplifier circuit comprises an operational amplifier 154, a resistor 160, and 172, a capacitor 164 and a diode 162 arranged as shown. This circuit 148 sums all the signals from all of the I/O modules together at one point. This output is coupled via a capacitor 164 and a resistor 166 to a distribution amplifier 174. The distribution amplifier 174 comprises operational amplifiers 156, 158 and resistors 168, 170 and 172 arranged as shown. This circuit provides a balanced output therefrom which is provided to each of the I/O modules via a balanced bus output 176.

The summed signal from the distribution amplifier 174 is provided in this way back to the I/O module from which the post-fader signal is obtained. This audio signal contains all selected audio signals input to the mixer console, including that which was input at the circuit 100. The summed signal is received at the I/O module by a balance bus receiver 178 via resistors 180 and 182. This receiver circuit 172 is comprised of an operational amplifier 196, resistors 186, 188, 190 and 192, and capacitors 184 and 194 arranged as shown.

Returning to FIG. 3A, this balanced receiver provides a single output signal which is coupled to a second analog switch 200 via a resistor 202. This analog switch 200 is further coupled to a balanced receiver circuit 286 comprised of an operational amplifier 208, resistors 224, 22, 216, 218, 210 and 212, and capacitors 214, 226 and 220 arranged as shown. The balanced receiver 286 is provided with the input signal, which is coupled through the analog switch 128 to the circuit 112. This circuit receives the signal output along the signal paths 130 and 132 and inverts it by shifting its phase 180°. The capacitors are selected to compensate for any effects on the phase of the input signal when it is summed in the cleanfeed module. For example, in the preferred embodiment, a 10 pF capacitor 226 was used to compensate for phase shifting arising from the balanced bus. The trim potentiometer 206 is provided to ensure that the amplitude of the inverted signal matches the input audio signal component of the audio signal provided from the summing amplifier to the second analog switch 200.

The inverted signal is coupled to the analog switch 200 via switch 200B. The summed signal is coupled to the analog switch 200 via switch 200A. Thus, when both these switches are closed, the inverted signal and the summed signal are summed at junction 288. At this point, the input audio signal from the prefader which forms a component of the summed signal is cancelled by the inverted signal from the circuit 286. The mix-minus signal from this junction is then provided to drive circuits from which it is made available to the monitor devices.

More specifically, as shown, the switches 200A and 200B coupling the summing circuitry and the inverting circuitry are controlled by a logic signal supplied from a direct output/mix-minus select pin 110 of the D-SUB connector of the I/O module. When this pin is grounded, a logic low signal is inverted by the inverter 244 to a logic high signal. This logic high signal closes switches 200A, 200B and 200C. On the other hand, when the direct output/mix-minus select pin is not grounded, a 5 V signal is supplied via a resistor 242 to the inverter 244 from which a logic low signal is obtained. This logic low signal opens the switches 200A, 200B, and 200C of the analog switch 200.

When placed in a closed position by grounding the direct output/mix-minus select pin, the mix-minus signal from the junction 188 is input to a pair of unity gain inverting amplifiers. These amplifiers 290 and 292 respectively comprise an operational amplifier 232, resistors 202 and 230, and a capacitor 228, and an operational amplifier 240, resistors 234 and 238 and a capacitor 236. The mix-minus signal is then coupled via the switch 200C to a balanced output driver circuit 294 (shown on FIG. 3B).

Further, because a fourth switch 200D of the analog switch 200 is directly coupled to the resistor 242 and the direct output/mix-minus select pin, this fourth switch has an opposite position of the other switches 200A, 200B and 200C in the analog switch 200. Accordingly, the signal from the direct output/mix-minus pin determines whether the prefade or postfade signal from the switching arrangement 104 is directly output or a mix-minus signal is output via the analog switch 200.

The selected output signal, either direct out or mix-minus, is provided to a balanced output driver circuit 294 which is configured to drive a standard 600 Ω load. This circuit 294 comprises the operational amplifiers 260 and 270, resistors 248, 258, 250, 262, 252, 254, 246, 272, and 276, and capacitors 256 and 274, arranged as shown. The high and low outputs from this balanced output driver are coupled via respective capacitors 264, 278 and resistors 282, 280 to an output transformer 284. A monitor signal may be provided from this transformer 284 to a connector port 108 from which the monitor signal may be provided to monitor devices, such as an amplifier and a speaker.

According to this embodiment of the invention, each I/O module in a mixer console may provide a monitor signal which is either a direct output of a selected audio signal provided to the I/O module or a mix-minus output. The mix-minus output is a summed signal comprising all the active audio signals in the mixer except the audio input coupled to the individual I/O module from which the mix-minus signal is received.

As described herein, all the signal subtraction circuitry by which the mix-minus signals are obtained are contained on each of several different input/output modules. Each of these I/O modules are provided with a control port by which the monitor output may be controlled. Moreover, the signal summing of all the inputs is performed at one location in the mixer console, specifically at the clean feed module. This arrangement provides flexibility and low-cost not seen in the prior art.

While specific values for each of the components of this arrangement are specified in the drawings, the invention is not so limited. However, it is observed that the values indicated provide a mix-minus signal in which the input audio signal (the post-fader signal) is attenuated by the mix-minus circuitry by at least −60 dB at frequencies of 10 to 20 kHz. Of course, as higher frequencies are used, performance becomes more limited. Still, in usual applications where audible frequencies are used, this performance essentially eliminates the echo and feedback effects discussed herein.

The foregoing is a detailed description of the preferred embodiment. The scope of the invention, however, is not so limited. Various alternatives will be readily apparent to one of ordinary skill in the art. The invention is only limited by the claims appended hereto.

What is claimed is:

1. An audio mixer device for mixing a plurality of input audio channels, comprising:

a plurality of connecting terminals for receiving a corresponding number of said plurality of input audio channels; and a plurality of mix-minus circuits each obtaining a mix-minus signal based on said plurality of input audio channels, each said mix-minus circuits including:

switching means for routing one of said plurality of input audio channels to a bus according to a logic signal input to the mixer device, said bus being connected to a summing circuit which sums together said input audio channel with selected ones of said plurality of input audio channels that are provided to said bus and providing a summed audio signal based thereon to an output terminal;

an inverter circuit having an output coupled to said output of said summing circuit, said inverter circuit inverting said input audio channel by shifting the phase of said input audio channel by 180° and providing an inverted audio signal to said output of the inverter circuit; and means coupled to said output of said inverter circuit and said output of said summing circuit for routing said mix-minus signal based on a resulting combining of said inverted audio signal and said sum signal to an output terminal located on said mixer device;

wherein said plurality of connecting terminals, said plurality of mix-minus circuits, and each said output terminal are located on a corresponding number of input/output modules provided in the audio mixer device;

wherein said means for routing to said output terminal said mix-minus signal includes a switch which alternatively routes said mix-minus signal or a direct output audio signal according to a second logic signal provided from said connector.

2. The audio mixer device according to claim 1 wherein said summing circuit is provided in an additional module located in the mixer device.

3. The audio mixer device according to claim 2 wherein the audio mixer device is coupled to a broadcasting means for providing an input audio signal to one of said input/output modules, said input audio signal being received from a remote location, and for broadcasting a monitor signal received from the output terminal of the input/output module to which the broadcasting means is coupled.

4. The audio mixer device according to claim 1 wherein said input logic signal is provided from the connector located on each said input/output modules.

5. An audio mixer device for mixing a plurality of input audio channels, comprising:

a plurality of connecting terminals for receiving a corresponding number of said plurality of input audio channels; and a plurality of mix-minus circuits each obtaining a mix-minus signal based on said plurality of input audio channels, each said mix-minus circuits including:

switching means for routing one of said plurality of input audio channels to a bus according to a logic signal input to the mixer device, said bus being connected to a summing circuit which sums together said input audio channel with selected ones of said plurality of input audio channels that are provided to said bus and providing a summed audio signal based thereon to an output terminal;

an inverter circuit having an output coupled to said output of said summing circuit, said inverter circuit inverting said input audio channel by shifting the phase of said input audio channel by 180° and providing an inverted audio signal to said output of the inverter circuit; and means coupled to said output of said inverter circuit and said output of said summing circuit for routing said mix-minus signal based on a resulting combining of said inverted audio signal and said sum signal to an output terminal located on said mixer device;

wherein said plurality of connecting terminals, said plurality of mix-minus circuits, and each said output terminal are located on a corresponding number of input/output modules provided in the audio mixer device;

wherein said input logic signal is provided from the connector located on each said input/output modules;

wherein said means for routing to said output terminal said mix-minus signal includes an analog switch which alternatively routes said mix-minus signal or a direct output audio signal according to a second logic signal provided from said connector.

6. The audio mixer device according to claim 5 wherein said mix-minus circuit further comprises a switching network which provides said input audio channel as said direct output either as a prefader signal or a postfader signal, said postfader signal being transmitted through a fader circuit prior to being input to said mix-minus circuit and said prefader signal being directly provided as said direct output without first being transmitted through said fader circuit.

7. The audio mixer device according to claim 5 wherein said first logic signal and said second logic signal are controlled by a control device, said control device including a microprocessor and an associated memory, said associated memory storing the state of each of said first logic signal and said second logic signal provided to each said mix-minus circuits.

* * * * *